US012766742B2

(12) United States Patent
Chu et al.

(10) Patent No.: US 12,766,742 B2
(45) Date of Patent: Oct. 20, 2026

(54) GRIPPER STRUCTURE

(71) Applicant: GUDENG EQUIPMENT CO., LTD., New Taipei City (TW)

(72) Inventors: Chia-Hung Chu, New Taipei City (TW); Wei-Yun Chen, New Taipei City (TW); Fang-Yin Jhu, New Taipei City (TW); Lin-Hsin Tu, New Taipei City (TW); Ming-Mo Lo, New Taipei City (TW); Hung-Che Lai, New Taipei City (TW)

(73) Assignee: GUDENG EQUIPMENT CO., LTD., New Taipei City (TW)

( * ) Notice: Subject to any disclaimer, the term of this patent is extended or adjusted under 35 U.S.C. 154(b) by 328 days.

(21) Appl. No.: 18/780,505

(22) Filed: Jul. 23, 2024

(65) Prior Publication Data

US 2025/0375901 A1 Dec. 11, 2025

(30) Foreign Application Priority Data

Jun. 11, 2024 (TW) ................................ 113121461

(51) Int. Cl.
*B25J 15/00* (2006.01)
*B25J 15/02* (2006.01)
*B25J 15/10* (2006.01)

(52) U.S. Cl.
CPC ....... *B25J 15/0028* (2013.01); *B25J 15/0033* (2013.01); *B25J 15/0206* (2013.01); *B25J 15/103* (2013.01)

(58) Field of Classification Search
CPC ............... B25J 15/0028; B25J 15/0033; B25J 15/0206; B25J 15/103
See application file for complete search history.

(56) References Cited

U.S. PATENT DOCUMENTS 6,190,103 B1 * 2/2001 Erez .................... H10P 72/0466 414/217
6,918,735 B2 * 7/2005 Urban ................. H10P 72/7602 901/14
10,434,662 B2 * 10/2019 Jalenques .............. B25J 15/086
10,751,886 B2 * 8/2020 Eberle ................ G01N 35/0099
11,279,046 B2 * 3/2022 Seo ...................... B25J 15/0061

* cited by examiner

*Primary Examiner* — Sang K Kim

(57) ABSTRACT

A gripper structure includes a rotation center, rotation power component and at least three clamp component sets. The rotation power component is dynamically connected to the rotation center. Each of the clamp component sets includes a swing shaft and an arc arm. One end of each of the swing shafts is connected to the rotation center and the other end is away from the rotation center. The arc arms are all arc-shaped. One end of each of the arc arms is connected to a fixed endpoint, and the other end is slidably connected to a corresponding one of the swing shafts. An area enclosed by the arc arms changes according to a rotation angle of the swing shafts. The gripper structure of the present application is for solving multiple issues of balance, synchronicity and center alignment of a force received.

10 Claims, 6 Drawing Sheets

100

100

100a

GRIPPER STRUCTURE

CROSS-REFERENCE TO RELATED APPLICATION

This non-provisional application claims priority under 35 U.S.C. § 119(a) on Patent Application No(s). 113121461 filed in Taiwan, R.O.C. on Jun. 11, 2024, the entire contents of which are hereby incorporated by reference.

BACKGROUND OF THE INVENTION

1. Field of the Invention

The present application relates to a gripper structure, and in particular to a gripper structure using a single power and capable of ensuring a uniform force received.

2. Description of the Related Art

The structure of a common gripper structure mostly uses a two-shaft cylinder as a power source or a jaw cylinder for clamping. The automation industry more frequently utilizes driving means such as motors, of which a force needs to take vertical retrieval and object weights into consideration. With these parameters, it is calculated whether the torque of a motor is sufficient for clamping and movement. Moreover, flatness and force balance produced by a surface contact also need to be considered for clamping and retrieval in a contact state. With this approach, a flexible structure is used to come into contact with an object to achieve an over-pressurized state so as to further ensure clamping balance.

The balance and synchronicity of a surface contact of a gripper are in particular critical in such consideration. In the event of inadequate force balance, it is possible that a clamped object can become deviated or even fall off. A method for fine-tuning a region subject to a force is also needed in order to avoid any gap between the gripper and the object. However, even if a flexible structure is used for clamping, failure in reliably clamping the clamped object can still be resulted if a force received is not properly balanced, and force conditions actually taking place at the clamped object cannot be calculated, hence leading to distortion in the clamping accuracy.

Current grippers need to overcome the issues including a non-uniform force received, an unstable force applied, center alignment to be ensured, and a clamped object needing to be securely clamped. Moreover, while achieving a goal of power-saving, a large mechanism design also needs to be reduced.

BRIEF SUMMARY OF THE INVENTION

Therefore, to overcome various issues of a conventional gripper, the present application provides a gripper structure using a single power and capable of ensuring a uniform force received.

To achieve the above and other objects, the present application provides a gripper structure including: a rotation center; a rotation power component, dynamically connected to the rotation center; and at least three clamp component sets, wherein each of the clamp component sets includes a swing shaft and an arc arm, one end of each of the swing shafts is connected to the rotation center and the other end is away from the rotation center, the arc arms are all arc-shaped, and one end of each of the arc arms is connected to a fixed endpoint and the other end is slidably connected to a corresponding swing shaft, and wherein an area enclosed by the arc arms changes according to a rotation angle of the swing shafts.

In one embodiment of the present application, the swing shafts are distributed at equal angles from one another.

In one embodiment of the present application, the swing shafts are coplanar.

In one embodiment of the present application, each of the clamp component sets further includes a slidable sleeve slidably sleeving the swing shaft, and the arc arm is connected to the slidable sleeve.

In one embodiment of the present application, each of the clamp component sets further includes a heightening column, and each of the arc arms is connected to the corresponding swing shaft by the heightening column.

In one embodiment of the present application, heights of the individual heightening columns are not entirely equal to one another.

In one embodiment of the present application, the height of each of the heightening columns is different from a height of the corresponding fixed endpoint.

In one embodiment of the present application, the arc arm is positive arc-shaped.

In one embodiment of the present application, each of the clamp component sets further includes an auxiliary member disposed at the corresponding arc arm, and the auxiliary member protrudes from the arc arm in at least one direction.

In one embodiment of the present application, the clamp component sets are four in quantity.

Thus, the gripper structure of the present application requires only one rotational power as a power source for mechanical clamping, and is free from concerns of non-synchronicity or an unstable force applied of different power sources, so that an object can be uniformly clamped by the arc arms, thereby fulfilling multiple requirements of a stable force received and accurate center alignment, achieving the goal of power-saving, and further reducing a complicated mechanism design.

DETAILED DESCRIPTION OF THE INVENTION

To fully understand the present application, the present application is described in detail by way of specific embodiments with reference to the accompanying drawings below. A person skilled in the art would be able to understand the objects, features and effects of the present application on the basis of the application of the present application. It should be noted that, the present application may be implemented or applied by other different embodiments, and changes and modifications may also be made on the basis of different perspectives and applications to various details in the description without departing from the spirit of the present application. Technical contents associated with the present application are described in detail below, and it should be noted that the application is not to be construed as limitations to the scope of claims of the present application. Associated details are described below.

Figure 1A:
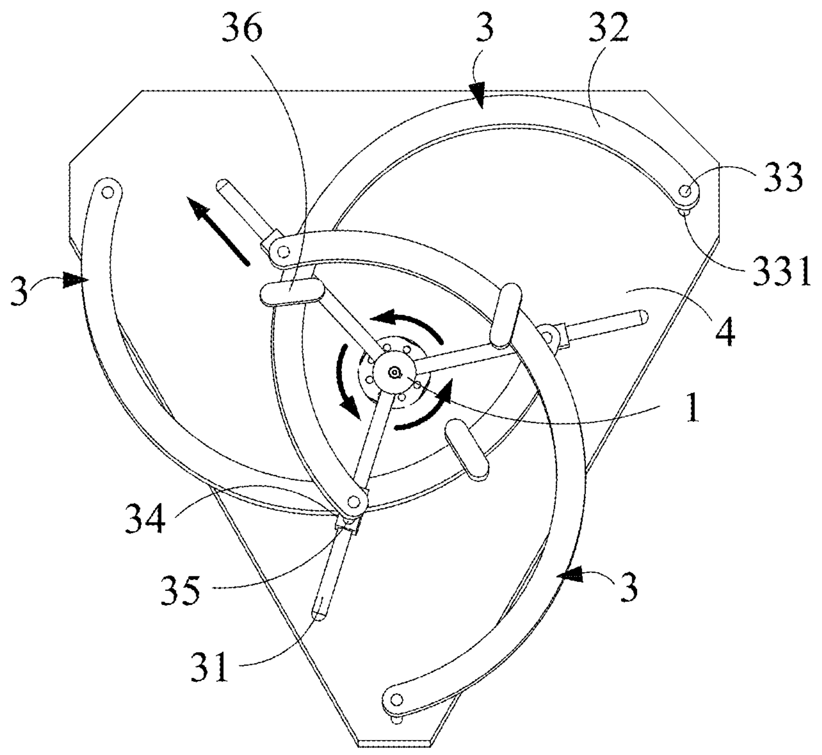
FIG. 1A is a perspective schematic diagram of a gripper structure before tightening according to a first embodiment of the present application.
Figure 1B:
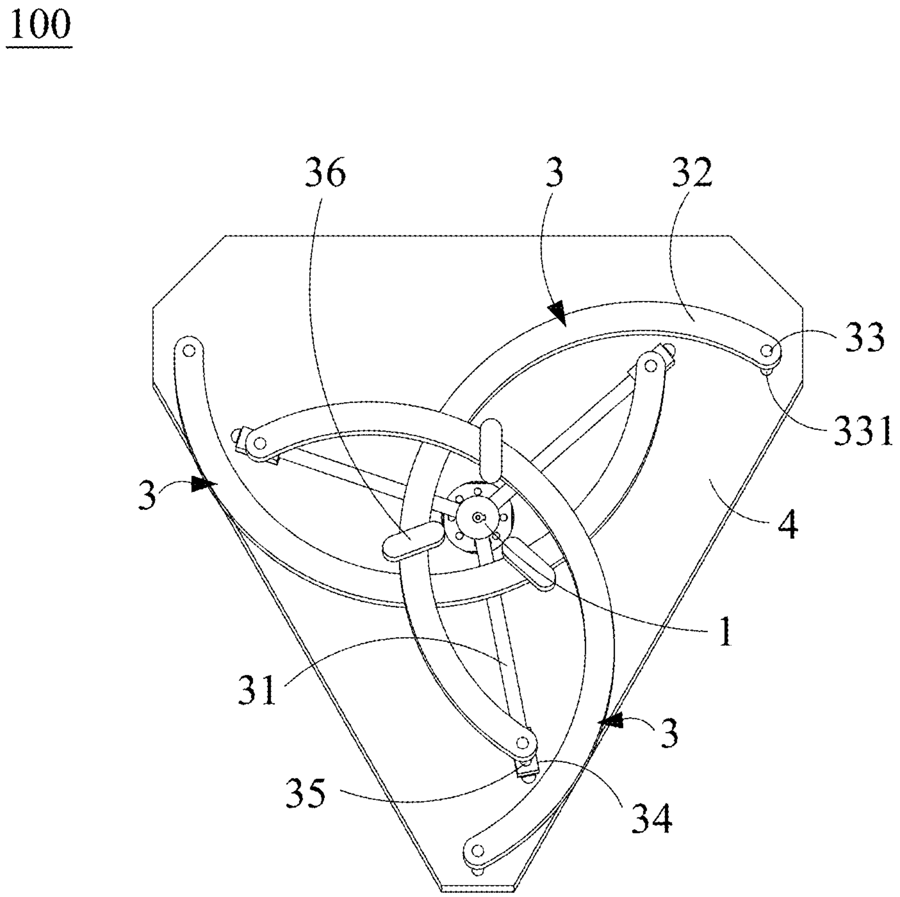
FIG. 1B is a perspective schematic diagram of a gripper structure after tightening according to the first embodiment of the present application.
Figure 1C:
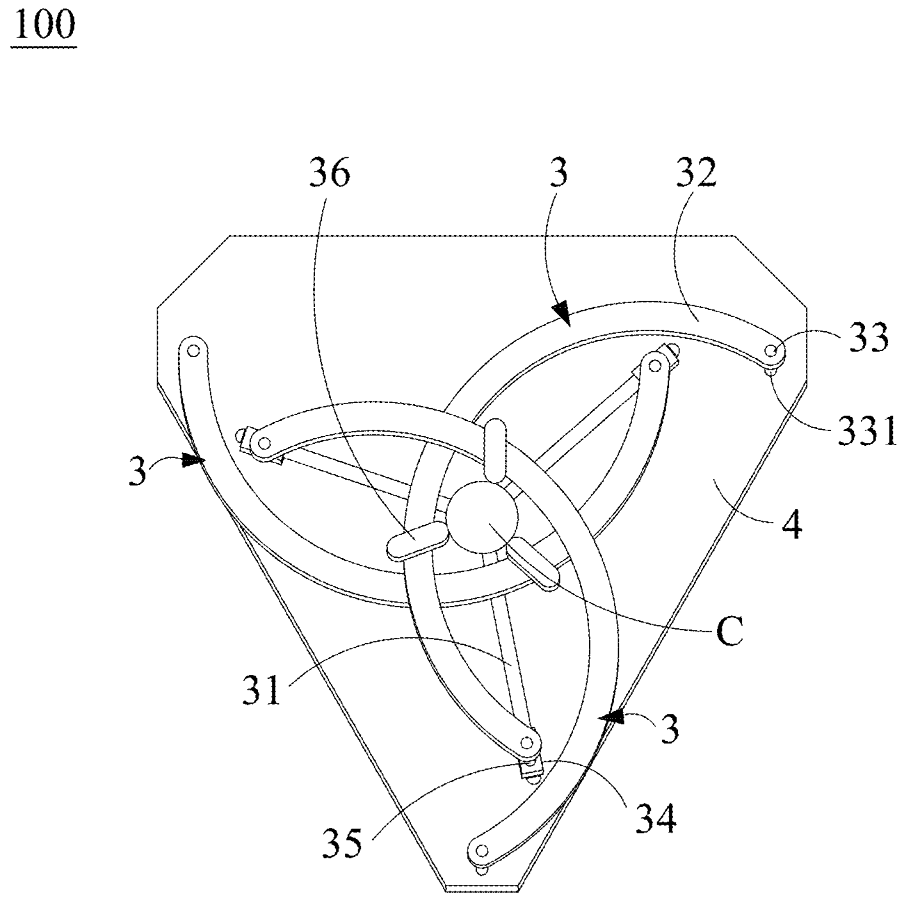
FIG. 1C is a schematic diagram of a gripping state of FIG. 1B.
Figure 2:
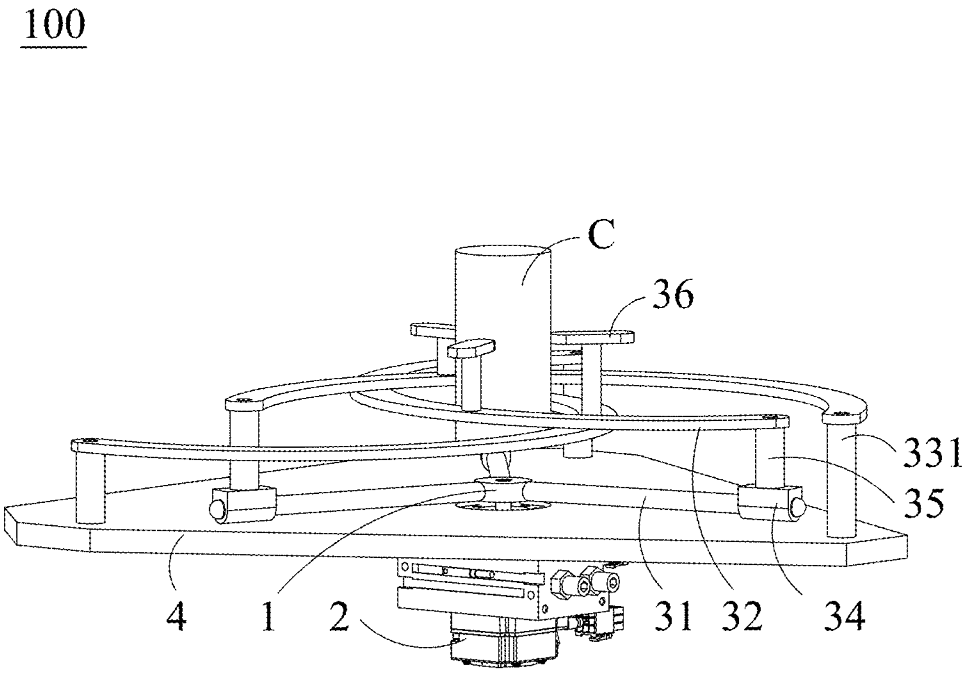
FIG. 2 is a perspective schematic diagram of a gripper structure according to the first embodiment of the present application.

As shown in FIG. 1A to FIG. 2, a gripper structure 100 according to an embodiment of the present application includes a rotation center 1, a rotation power component 2 and at least three clamp component sets 3.

The rotation power component 2 is dynamically connected to the rotation center 1, and the rotation center 1 is a central position of a rotational power eventually output by the rotation power component 2. The rotation power component 2 is a component such as a motor, and preferably has a rotation stroke controlled by an electrical signal. Alternatively, a motor can coordinate with components such as a reduction gear set to output appropriate rotational speed and torque.

Each of the clamp component sets 3 includes a swing shaft 31 and an arc arm 32. One end of each swing shaft 31 is connected to the rotation center 1 and the other end is away from the rotation center 1. These arc arms 32 are all arc-shaped, and one end of each of the arc arms 32 is connected to a fixed endpoint 33. The fixed endpoint 33 is fixed relative to the rotation center 1, and the end of each arc arm 32 is connected to the fixed endpoint 33 by means of pivotal connection. The fixed endpoint 33 of each group can be disposed on a board 4; however, the present application is not limited to the example above.

The other end (the end away from the fixed endpoint 33) of each arc arm 32 is slidably connected to the corresponding swing shaft 31 of the same group. When the swing shafts 31 receive a rotational force output by the rotation power component 2 and rotate, for example, as the counterclockwise arrows shown in FIG. 1A, the arc arms 32 are also driven to move (as shown by the straight arrow). Since the arc arms 32 are pivotally connected to the fixed endpoints 33 instead of the rotation center 1, an area enclosed by these arc arms 32 changes according to a rotation angle of the swing shafts 31.

To change from the state in FIG. 1A to the state in FIG. 1B, the area enclosed by these arc arms 32 is reduced to thereby clamp and pick up an object C shown in FIG. 1C; conversely, the object C can be released by returning from the state in FIG. 1C to the state in FIG. 1A (the swing shafts 31 are switched to rotate clockwise). During such clamping and retrieval process, only a single power source is needed, and thus there are no concerns of non-synchronicity or an unstable force applied of different power sources, so that the object C can be uniformly clamped by the arc arms 32, thereby fulfilling multiple requirements of a stable force received and accurate center alignment, achieving the goal of power-saving, and further reducing a complicated mechanism design. The novel gripper structure of the present application is more advantageous in comparison with the prior art.

Further, in this embodiment, these swing shafts 31 are distributed at equal angles from one another. Taking three swing shafts 31 for example, these swing shafts 31 are distributed at an angle of 120 degrees from one another. However, the present application is not limited to the example above. In other embodiments, the swing shafts can be distributed at different angles from one another, so as to adapt to objects to be clamped in special shapes, specification or requirements.

Further, in this embodiment, these swing shafts 31 are coplanar. However, the present application is not limited to the examples above. In other embodiments, these swing shafts 31 can be non-coplanar; for example, these swing shafts 31 and the rotation center 1 form a polygonal pyramid structure.

Further, in this embodiment, as shown in FIG. 1A to FIG. 2, each clamp component group 3 further includes a slidable sleeve 34 slidably sleeving the swing shaft 31. The arc arm 32 is slidably connected to the swing shaft 31 by connecting the slidable sleeve 34. However, the present application is not limited to the examples above. In other embodiments, the arc arm 32 can be slidably connected to the swing shaft 31 by other mechanical structures.

Further, in this embodiment, as shown in FIG. 1A to FIG. 2, each clamp component group 3 further includes a heightening column 35, and each arc arm 32 is connected to the corresponding swing shaft 31 by the heightening column 35. One function of the heightening column 35 is to keep the arc arm 32 from being too close to the board 4, and another function is to coordinate the height of each arc arm 32 to prevent conflicts between mechanisms.

As shown in FIG. 2, the heights of the individual heightening columns 35 are not entirely equal to one another. Thus, height differences are present among the arc arms 32, allowing the arc arms 32 to be slightly staggered from one another.

Further, a column 331 of the fixed endpoint 33 can be used in conjunction to adjust the height of each arc arm 32. The height of each heightening column 35 is different from the height of the corresponding fixed endpoint 33, so that the arc arms 32 of the same group can have a change in height so as to be slightly staggered from other arc arms 32.

Further, in this embodiment, the arc arms 32 are positive arc-shaped. However, the present application is not limited to the examples above. In other embodiments, the arc arms 32 can be arcs to different extents such as elliptical arc instead of being arcs of a perfect circle.

Further, in this embodiments, as shown in FIG. 1A to FIG. 2, each clamp component group 3 further includes an auxiliary member 36 disposed at the corresponding arc arm 32. The auxiliary member 36 protrudes from the arc arm 32 in at least one direction (for example, in a lengthwise, widthwise or height direction). The auxiliary member 36 functions to assist in clamping the object C, and can also function as an element for a physical contact with the object C. The shape, size, dimensions, material, arrangement position and angle of the auxiliary member 36 can be changed according to different requirements. In other words, the same clamp component group 3 can be fine-tuned by mounting different auxiliary members 36 to adjust the position at which it actually comes into contact with and clamps the object C.

Figure 3A:
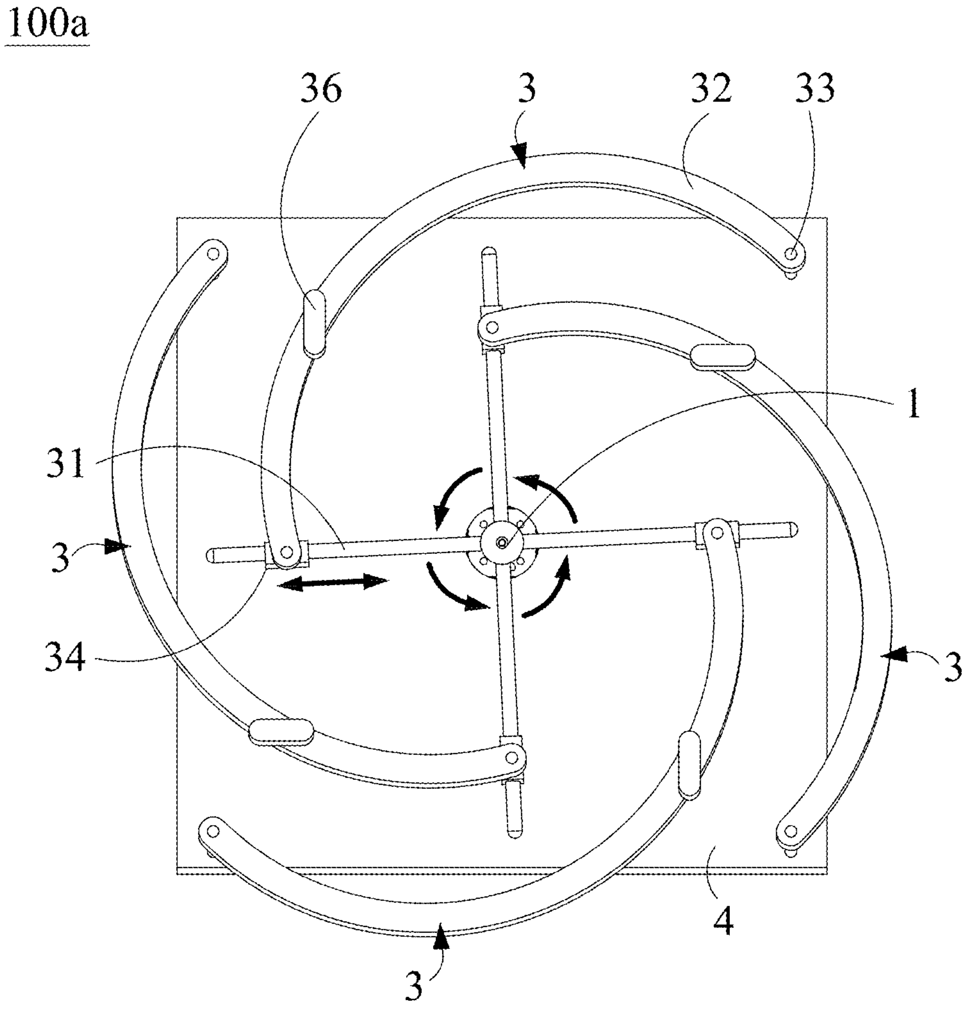
FIG. 3A is a perspective schematic diagram of a gripper structure before tightening according to a second embodiment of the present application.
Figure 3B:
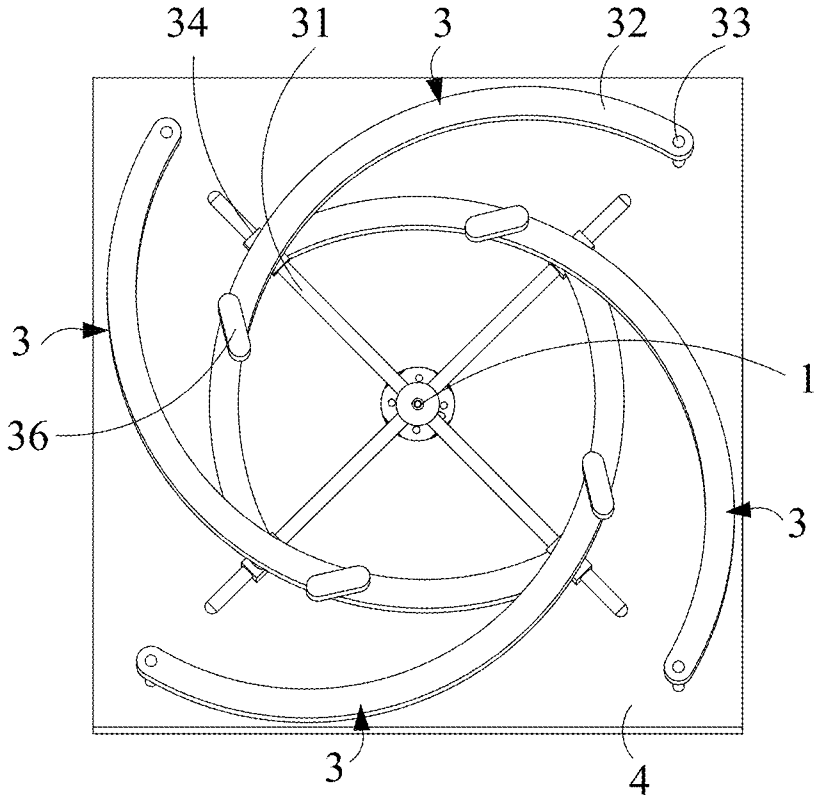
FIG. 3B is a perspective schematic diagram of a gripper structure after tightening according to the second embodiment of the present application.

Further, the present application provides a gripper structure 100*a* according to a second embodiment. The gripper structure 100*a* primarily differs from the gripper structure 100 in that, the gripper structure 100*a* has four clamp component sets 3. Similarly, as shown in FIG. 3A and FIG. 3B, by changing the rotation angle of the swing shafts 31, the area enclosed by four arc arms 32 is also changed to thereby release or tighten clamping on an object. In other embodiments, the gripper structure can include more clamp component sets 3, and the present application is not limited to the examples above.

While the present application has been described by means of specific embodiments, numerous modifications and variations could be made thereto by those skilled in the art without departing from the scope and spirit of the present application set forth in the claims.

What is claimed is:

1. A gripper structure, comprising:

a rotation center;

a rotation power component, dynamically connected to the rotation center; and at least three clamp component sets, wherein each of the clamp component sets comprises a swing shaft and an arc arm, one end of each of the swing shafts is connected to the rotation center and one other end is away from the rotation center, the arc arms are all arc-shaped, and one end of each of the arc arms is connected to a fixed endpoint and one other end is slidably connected to a corresponding swing shaft, wherein an area enclosed by the arc arms changes according to a rotation angle of the swing shafts.

2. The gripper structure according to claim 1, wherein the swing shafts are distributed at equal angles from one another.

3. The gripper structure according to claim 1, wherein the swing shafts are coplanar.

4. The gripper structure according to claim 1, wherein each of the clamp component sets further comprises a slidable sleeve slidably sleeving the swing shaft, and the arc arm is connected to the slidable sleeve.

5. The gripper structure according to claim 1, wherein each of the clamp component sets further comprises a heightening column, and each of the arc arms is connected to the corresponding swing shaft by the heightening column.

6. The gripper structure according to claim 5, wherein heights of the individual heightening columns are not entirely equal to one another.

7. The gripper structure according to claim 5, wherein a height of each of the heightening columns is different from a height of the corresponding fixed endpoint.

8. The gripper structure according to claim 1, wherein the arc arm is positive arc-shaped.

9. The gripper structure according to claim 1, wherein each of the clamp component sets further comprises an auxiliary member disposed at the corresponding arc arm, and the auxiliary member protrudes from the arc arm in at least one direction.

10. The gripper structure according to claim 1, wherein the clamp component sets are four in quantity.

* * * * *